United States Patent
Hatta et al.

(10) Patent No.: US 10,141,615 B2
(45) Date of Patent: Nov. 27, 2018

(54) BATTERY HOUSING STRUCTURE

(71) Applicant: NGK Insulators, Ltd., Nagoya-Shi (JP)

(72) Inventors: Tetsuya Hatta, Kuwana (JP); Tomio Tamakoshi, Kasugai (JP)

(73) Assignee: NGK Insulators, Ltd., Nagoya (JP)

(*) Notice: Subject to any disclaimer, the term of this patent is extended or adjusted under 35 U.S.C. 154(b) by 1350 days.

(21) Appl. No.: 13/937,489

(22) Filed: Jul. 9, 2013

(65) Prior Publication Data

US 2013/0295428 A1 Nov. 7, 2013

Related U.S. Application Data

(63) Continuation of application No. PCT/JP2011/079489, filed on Dec. 20, 2011.

(30) Foreign Application Priority Data

Feb. 3, 2011 (JP) .................................. 2011-021599

(51) Int. Cl.
*H01M 2/10* (2006.01)
*H01M 10/39* (2006.01)
(Continued)

(52) U.S. Cl.
CPC ......... *H01M 10/50* (2013.01); *H01M 2/1088* (2013.01); *H01M 2/1094* (2013.01);
(Continued)

(58) Field of Classification Search
None
See application file for complete search history.

(56) References Cited

U.S. PATENT DOCUMENTS 4,443,524 A * 4/1984 Meinhold ........... H01M 2/1088
429/120
5,578,393 A * 11/1996 Haskins .............. H01M 2/1094
429/120
(Continued)

FOREIGN PATENT DOCUMENTS

GB 2277830 A * 11/1994 .......... H02M 2/1094
JP 06-283217 A1 10/1994
(Continued)

OTHER PUBLICATIONS

Kawaguchi et al. JP 2000-021364, Machine translation, 14 pages total.*
(Continued)

*Primary Examiner* — Ula C Ruddock
*Assistant Examiner* — Anna Korovina
(74) *Attorney, Agent, or Firm* — Burr & Brown, PLLC (57) ABSTRACT

A module battery is housed in a module battery housing rack. An electric cell is housed in a container. The container is provided with a high thermal conductive wall and a low thermal conductive wall. A first portion of a plate overlaps the outer surface of the high thermal conductive wall and a second portion of the plate protrudes from the outer surface. The second portion surrounds the first portion. A first main surface of the plate is brought into direct contact with the outer surface at the first portion and it is apart from the container at the second portion. A second main surface of the plate is exposed to a space, to which heat is allowed to radiate. An opening may or may not be formed at the first portion. A thermal conducting medium may be held between the first wall and the first portion.

14 Claims, 8 Drawing Sheets

(51) Int. Cl.
*H01M 10/653* (2014.01)
*H01M 10/6554* (2014.01)
*H01M 10/617* (2014.01)
*H01M 10/627* (2014.01)
*H01M 10/613* (2014.01)
*H01M 10/658* (2014.01)
*H01M 10/60* (2014.01)
*H01M 10/6563* (2014.01)
*H01M 10/6566* (2014.01)

(52) U.S. Cl.
CPC ..... *H01M 10/3909* (2013.01); *H01M 10/613* (2015.04); *H01M 10/617* (2015.04); *H01M 10/627* (2015.04); *H01M 10/653* (2015.04); *H01M 10/658* (2015.04); *H01M 10/6554* (2015.04); *H01M 10/6563* (2015.04); *H01M 10/6566* (2015.04); *H01M 2220/10* (2013.01)

(56) References Cited

U.S. PATENT DOCUMENTS

| | | | | |
|---|---|---|---|---|
| 2004/0042178 | A1* | 3/2004 | Gektin | H01L 23/42 361/705 |
| 2008/0220319 | A1 | 9/2008 | Takagi et al. | |
| 2011/0189523 | A1* | 8/2011 | Eom | H01M 10/60 429/120 |

FOREIGN PATENT DOCUMENTS

| | | | | |
|---|---|---|---|---|
| JP | 08017464 | A | * 1/1996 | |
| JP | 09330738 | A | * 12/1997 | |
| JP | 11-185801 | A1 | 7/1999 | |
| JP | 2000021364 | A | * 1/2000 | |
| JP | 2000048857 | A | * 2/2000 | |
| JP | 2004-047208 | A1 | 2/2004 | |
| JP | 2004-055373 | A1 | 2/2004 | |
| JP | 2008-226488 | A1 | 9/2008 | |
| JP | WO 2011142199 | A1 | * 11/2011 | ........... H01M 10/63 |
| JP | 3177969 | U | * 8/2012 | |

OTHER PUBLICATIONS

Kamiya et al. (JP 2000-048857), Machine translation, 24 pages total.*
Nishimura et al. (JPH08-17464), Machine translation, 2 pages total.*
Sato et al. (JPH 09-330738), Machine translation, 13 pages total.*
International Search Report dated Mar. 13, 2012 (with English translation).
Extended European Search Report (Application No. 11857787.3) dated Nov. 25, 2016.

\* cited by examiner

BATTERY HOUSING STRUCTURE

BACKGROUND OF THE INVENTION

Field of the Invention

The present invention relates to a battery housing structure in a power storage device.

Description of Related Art

A sodium-sulfur battery needs to be operated at a high temperature. Therefore, the sodium-sulfur battery is used in the state in which an electric cell is housed in a container (i.e., a heat insulating container) together with a heater and the like, as disclosed in Patent Document 1. Here, as referred to in paragraph 0010 of Patent Document 1, since it is undesirable that the inside temperature of the container rises too much, heat is allowed to radiate from the inside of the container to the outside thereof, as required.

On the other hand, a battery (i.e., a module battery) having electric cells for a sodium-sulfur battery housed in a container is used also in the state in which it is housed in a battery housing (i.e., a package), as disclosed in Patent Document 2. In this case, when heat is allowed to radiate from the inside of the container to the outside thereof, temperature around an electrode terminal is liable to rise. If the temperature around the electrode terminal rises, a current capable of flowing in the electrode terminal is limited and degradation of the electrode terminal is liable to be proceeded.

PRIOR ART DOCUMENT

Patent Document

Patent Document 1: Japanese Patent Application Laid-Open No. 2004-47208
Patent Document 2: Japanese Patent Application Laid-Open No. 2008-226488

SUMMARY OF THE INVENTION

Problems to be Solved by the Invention

The present invention has been accomplished to solve the above-described problem. An object is to provide a battery housing structure in which temperature around an electrode terminal is unlikely to rise.

Means for Solving the Problems

The present invention is directed to a battery housing structure.

In first to twelfth aspects of the present invention, a battery is housed in a battery housing. In the battery, an electric cell for a sodium-sulfur battery is housed in a container. The container includes a first wall having a relatively high thermal conductivity, and a second wall having a relatively low thermal conductivity. An electrode terminal for the battery penetrates the second wall. Inside the container, the electric cell and the electrode terminal are electrically connected to each other via a wiring. The battery housing is provided with a plate. A first portion of the plate overlaps the first wall whereas a second portion of the plate protrudes from the outer surface of the first wall. The second portion surrounds the first portion.

In the first aspect of the present invention, a first main surface of the plate is brought into direct contact with the outer surface of the first wall at the first portion whereas it is apart from the container at the second portion. A second main surface of the plate is exposed to a space, to which heat is allowed to radiate.

The second aspect of the present invention adds a further matter to the first aspect of the present invention. In the second aspect of the present invention, an opening is formed at the first portion. The opening has a smaller planar shape than that of the outer surface of the first wall. The opening is formed apart from the second portion. A first main surface is brought into direct contact with the periphery of the outer surface of the first wall at a non-opening other than the opening at the first portion.

The third aspect of the present invention adds a further matter to the first aspect of the present invention. In the third aspect of the present invention, the first main surface is brought into direct contact with the entire outer surface of the first wall over the entire first portion.

The fourth aspect of the present invention adds a still further matter to any one of the first to third aspects of the present invention. In the fourth aspect of the present invention, the battery housing further includes a supporter for supporting the plate at a support position apart from the first portion. The outer surface of the first wall is oriented upward in a vertical direction. The second portion has elasticity.

In the fifth aspect of the present invention, a first main surface of the plate faces the first wall at the first portion whereas it is apart from the container at the second portion. A second main surface of the plate is exposed to a space, to which heat is allowed to radiate. A thermal conducting medium is held between the first wall and the first portion.

The sixth or seventh aspect of the present invention adds a further matter to the fifth aspect of the present invention. In the sixth aspect of the present invention, the thermal conducting medium is a plate-like member made of metal or an alloy. In the seventh aspect of the present invention, the thermal conducting medium is a fibrous aggregate made of metal or an alloy.

The eighth or ninth aspect of the present invention adds a still further matter to any one of the first to seventh aspects of the present invention. In the eighth aspect of the present invention, the outer surface of the first wall is oriented upward in the vertical direction. In the ninth aspect of the present invention, the first wall is formed upward in the vertical direction, and the second wall is formed downward in the vertical direction.

The tenth aspect of the present invention adds a still further matter to any one of the first to ninth aspects of the present invention. In the tenth aspect of the present invention, the plurality of electric cells are housed inside the container, and the plurality of electric cells are arranged in a direction parallel to the first wall.

The eleventh aspect of the present invention adds a still further matter to any one of the first to tenth aspects of the present invention. In the eleventh aspect of the present invention, a ventilating mechanism forcibly ventilates the space, to which the heat is allowed to radiate.

The twelfth aspect of the present invention adds a still further matter to the eleventh aspect of the present invention. In the twelfth aspect of the present invention, the plurality of batteries are housed in the battery housing; the space, to which the heat is allowed to radiate, is common to the plurality of batteries; and the plurality of ventilating mechanisms forcibly ventilate the space, to which the heat is allowed to radiate.

Effects of the Invention

According to the present invention, the heat is allowed to radiate from the inside of the container to the space, to which the heat is allowed to radiate, via mainly the first wall and the first portion. Moreover, the space, in which the battery is housed, and the space, to which the heat is allowed to radiate, are apart from each other via the second portion. Consequently, the heat hardly flows from the space, to which the heat is allowed to radiate, to the space, in which the battery is housed, so that temperature around the electrode terminal hardly rises.

According to the fourth aspect of the present invention, the second portion is deformed whereas the first portion is pressed against the first wall, and heat resistance at an interface between the first wall and the plate is reduced, thus efficiently allowing the heat to radiate.

According to the fifth aspect of the present invention, the heat is allowed to radiate from the inside of the container to the space, to which the heat is allowed to radiate, via mainly the first wall, the thermal conducting medium, and the first portion. The space, in which the battery is housed, and the space, to which the heat is allowed to radiate, are separated from each other via the second portion, so that the heat hardly flows from the space, to which the heat is allowed to radiate, to the space, in which the battery is housed. Consequently, the temperature around the electrode terminal hardly rises. Moreover, the heat radiation amount is properly adjusted, and therefore, the temperature inside the container can be properly kept.

According to the eighth or ninth aspect of the present invention, the heat radiating from the first wall is hardly conducted around the electrode terminal, so that the temperature around the electrode terminal hardly rises.

According to the tenth aspect of the present invention, the heat is allowed to radiate in a direction perpendicular to the arrangement direction of the electric cells, thereby enhancing the uniformity of the temperature of the electric cell.

According to the eleventh or twelfth aspect of the present invention, the heat is allowed to radiate from the space, to which the heat is allowed to radiate, and therefore, the heat efficiently radiates. In particular, according to the twelfth aspect of the present invention, even if some of a plurality of ventilating mechanisms malfunction, the ventilation cannot completely stopped, thereby enhancing redundancy.

These and other objects, features, aspects, and advantages of the present invention will become more apparent from the following detailed description of the present invention when taken in conjunction with the accompanying drawings.

DETAILED DESCRIPTION OF THE INVENTION

First Embodiment (Outline of Battery Housing Structure)

A first embodiment relates a battery housing structure in a power storage device. The battery housing structure in the first embodiment is desirably combined with a constituent such as a bidirectional converter, a transformer, or a control circuit, to thus configure a power storage device. The power storage device is desirably connected to an electric system so as to adjustably supply and demand electric power. The battery housing structure in the first embodiment may be combined with other constituents, or may configure a device other than the power storage device.

Figure 1:
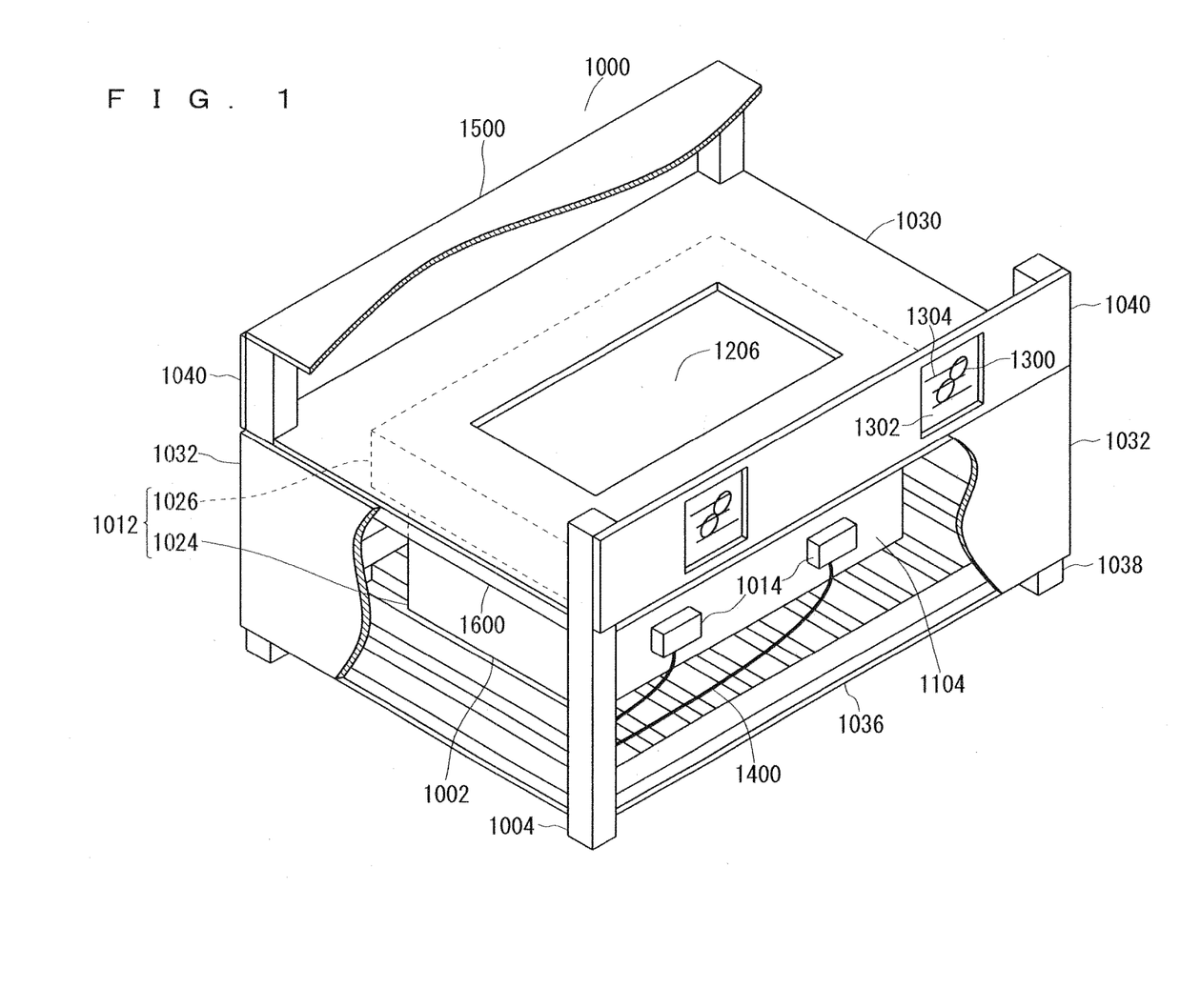
FIG. 1 is a perspective view showing a battery housing structure in a first embodiment.
Figure 2:
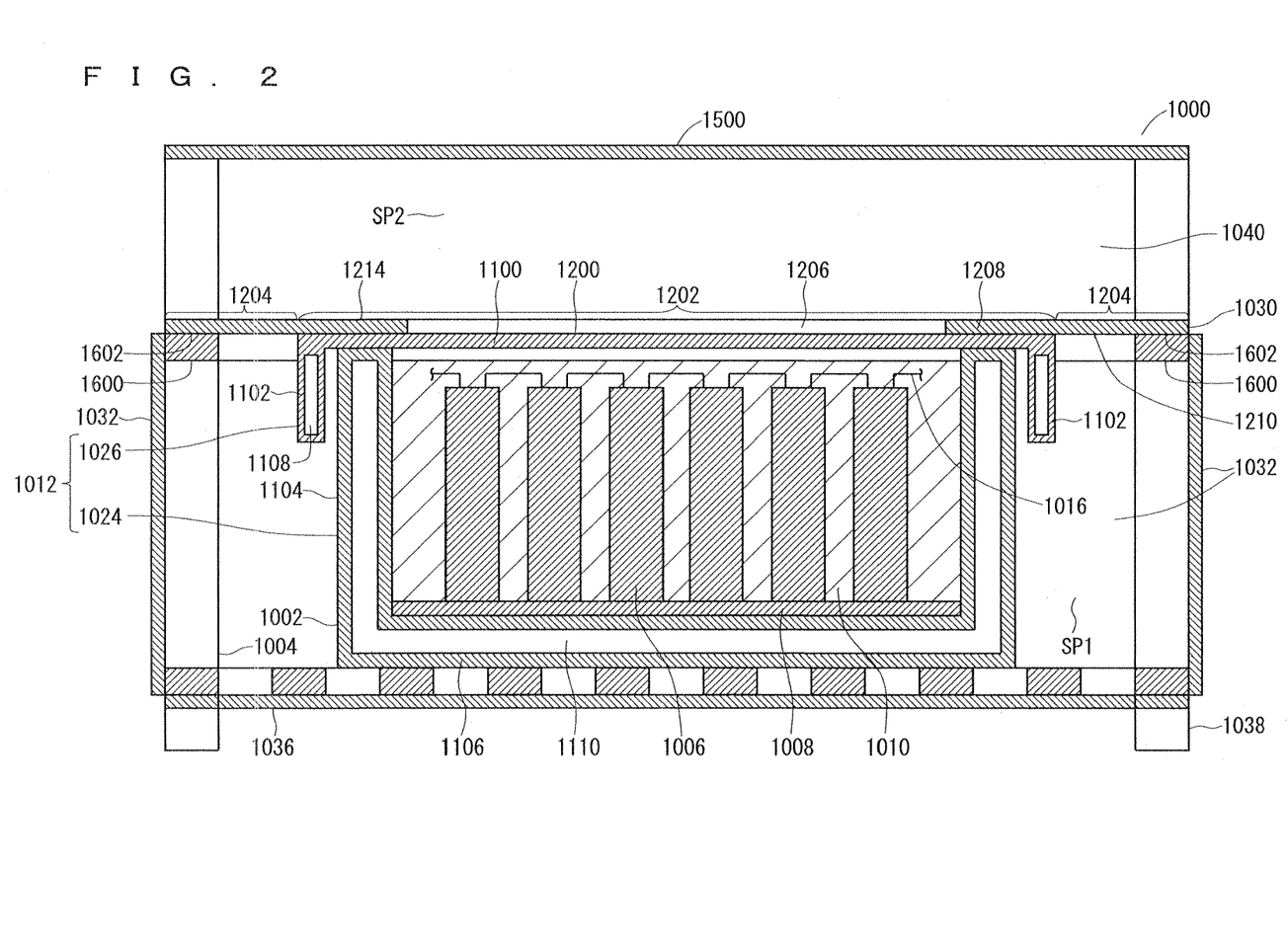
FIG. 2 is a cross-sectional view showing the battery housing structure in the first embodiment.

FIG. 1 and FIG. 2 are schematic views showing the battery housing structure in the first embodiment, wherein FIG. 1 is a perspective view whereas FIG. 2 is a cross-sectional view.

In a battery housing structure 1000 in the first embodiment, a module battery 1002 is housed in a module battery housing rack 1004, as shown in FIG. 1 and FIG. 2. The module battery 1002 may be housed in a structure that is not called a rack. More generally, the module battery 1002 is housed in a battery housing.

In the module battery 1002, electric cells 1006, a heater 1008, and sand 1010 are housed in a container 1012; electrode terminals 1014 penetrate a side wall 1104 of a casing 1024 constituting the container 1012; and the electric cell 1006 and the electrode terminal 1014 are electrically connected to each other via a wiring 1016 inside the container 1012. Other members to be contained such as a temperature sensor may be housed inside the container 1012. The module battery 1002 is an aggregate consisting of the electric cells 1006 and their accessories. The module battery 1002 is electrically charged and discharged via the electrode terminals 1014. Although the container 1012 is desirably formed into a cuboid or cube that is convenient for containment, it may be formed into other three-dimensional shapes.

The electric cell 1006 is a sodium-sulfur battery. When a power storage device is operated, the inside temperature of the container 1012 is adjusted by the heater 1008 to be thus kept at such a temperature as to actuate the sodium-sulfur battery.

The container 1012 has a structure in which an opening of the casing 1024 is covered with a cover 1026. The opening of the casing 1024 is closed by a top wall 1100 of the cover 1026.

The module battery housing rack 1004 has a structure in which a top plate 1030, side plates 1032, and a bottom plate 1036 are attached to a frame 1038. The top plate 1030, the side plates 1032, and the bottom plate 1036 define a space SP1, in which the module battery 1002 is housed. In addition, the module battery housing rack 1004 has a structure in which side plates 1040 are attached to the frame 1038. The side plates 1040 define a space SP2, to which heat is allowed to radiate. The space SP2, to which heat is allowed to radiate, is defined outside the module battery housing rack 1004. The heat may be allowed to radiate directly to the outside of the module battery housing rack 1004. Although the top plate 1030, the side plates 1032, the bottom plate 1036, and the side plates 1040 are typically made of metal or an alloy, they may be permitted to be made of other materials.

(Thermal Conductivity of Wall of Container)

The top wall 1100 of the cover 1026 is a solid member: in contrast, a side wall 1102 of the cover 1026 and the side wall 1104 and bottom wall 1106 of the casing 1024 are hollow members. A hollow portion 1108 defined by the side wall 1102 of the cover 1026 and a hollow portion 1110 defined by the side wall 1104 and bottom wall 1106 of the casing 1024 are reduced in pressure. Consequently, the top wall 1100 of the cover 1026 has no vacuum heat insulating structure: in contrast, the side wall 1102 of the cover 1026 and the side wall 1104 and bottom wall 1106 of the casing 1024 each have a vacuum heat insulating structure. Thus, the top wall 1100 of the cover 1026 has a relatively high thermal conductivity: in contrast, the side wall 1102 of the cover 1026 and the side wall 1104 and bottom wall 1106 of the casing 1024 have a relatively low thermal conductivity. Hence, heat is allowed to radiate from the inside of the container 1012 to the outside thereof through the top wall 1100 of the cover 1026.

(Heat Radiation Structure)

The top plate 1030 has a greater planar shape than that of an outer surface 1200 of the top wall 1100 of the cover 1026. A first portion 1202 occupying the center of the top plate 1030 overlaps the outer surface 1200 of the top wall 1100 of the cover 1026 whereas a second portion 1204 occupying the periphery of the top plate 1030 protrudes from the outer surface 1200 of the top wall 1100 of the cover 1026. The second portion 1204 surrounds the first portion 1202. One shaped member "overlapping" the other shaped member signifies that the planar shape of the one shaped member is the same as that of the other shaped member, and further, the planar position of the one shaped member is same as that of the other shaped member. Here, the direct contact of the one shaped member with the other shaped member is not important.

An opening 1206 is formed at the first portion 1202. The opening 1206 has a planar shape smaller than that of the outer surface 1200 of the top wall 1100 of the cover 1026. The opening 1206 is formed apart from the second portion 1204. A first main surface 1210 of the top plate 1030 is brought into direct contact with the periphery of the outer surface 1200 of the top wall 1100 of the cover 1026 at a non-opening 1208 other than the opening 1206 of the first portion 1202, and further, is apart from the container 1012 at the second portion 1204. A second main surface 1214 of the top plate 1030 is exposed to the space SP2, to which the heat is allowed to radiate.

With the heat radiation structure in the first embodiment, the center of the outer surface 1200 of the top wall 1100 of the cover 1026 is exposed to the space SP2, to which the heat is allowed to radiate. The heat radiating through the top wall 1100 of the cover 1026 is allowed to radiate to the space SP2, to which the heat is allowed to radiate, through the opening 1206 mainly formed at the first portion 1202. The space SP1, in which the module battery 1002 is housed, and the space SP2, to which the heat is allowed to radiate, are separated from each other via the second portion 1204. Consequently, the heat hardly flows from the space SP2, to which the heat is allowed to radiate, to the space SP1, in which the module battery 1002 is housed, so that the temperature around the electrode terminal 1014 hardly rises. When the temperature around the electrode terminal 1014 hardly rises, the temperature around the electrode terminal 1014 can be readily reduced down to an allowable temperature or lower even if air-conditioning facility is omitted or the performance of the air-conditioning facility is poor.

As long as the space SP1, in which the module battery 1002 is housed, and the space SP2, to which the heat is allowed to radiate, are separated from each other, the first main surface 1210 is not brought into contact with the outer surface 1200 of the top wall 1100 at the entire non-opening 1208, but the first main surface 1210 may be allowed to be brought into annular contact with the outer surface 1200 of the top wall 1100 at a part of the non-opening 1208. The second portion 1204 may be a solid member, but may be a hollow member that is suitable for inhibiting the heat from flowing in.

The outer surface 1200 of the top wall 1100 is oriented upward in a vertical direction. As a consequence, the heat radiating from the top wall 1100 is hardly conducted to the periphery of the electrode terminal 1014, so that the temperature around the electrode terminal 1014 hardly rises.

(Selection of High Thermal Conductive Wall and Low Thermal Conductive Wall)

Walls other than the top wall 1100 of the cover 1026 may have a relatively high thermal conductivity (hereinafter referred to as a "high thermal conductive wall"). Alternatively, walls other than the side wall 1102 of the cover 1026 and the side wall 1104 and bottom wall 1106 of the casing 1024 may have a relatively low thermal conductivity (hereinafter referred to as a "low thermal conductive wall").

In this case, the electrode terminal 1014 penetrates the low thermal conductive wall. A plate having a greater planar shape than that of the outer surface of the high thermal conductive wall is fixed to the frame 1038. The first portion of the plate overlaps the outer surface of the high thermal conductive wall whereas the second portion of the plate protrudes from the outer surface of the high thermal conductive wall. The second portion surrounds the first portion. The first portion has the opening formed thereat. The opening has a planar shape smaller than that of the outer surface of the high thermal conductive wall. The opening is formed apart from the second portion. The first main surface of the plate is brought into direct contact with the periphery of the outer surface of the high thermal conductive wall at the non-opening other than the opening of the first portion whereas it is separated from the container 1012 at the second portion. The second main surface of the plate is exposed to the space SP2, to which the heat is allowed to radiate.

Desirably, the high thermal conductive wall is disposed above the container 1012 in the vertical direction whereas the low thermal conductive wall is disposed under the container 1012 in the vertical direction. For example, the entire wall of the cover 1026 is the high thermal conductive wall whereas the entire wall of the casing 1024 is the low thermal conductive wall. As a consequence, the heat radiating from the high thermal conductive wall is hardly conducted around the electrode terminal 1014, so that the temperature around the electrode terminal 1014 hardly rises.

(Difference in Thermal Conductivity)

The difference in thermal conductivity between the high thermal conductive wall and the low thermal conductive wall may be caused by factors other than the existence of the vacuum heat insulating structure. For example, in the case where both of the high thermal conductive wall and the low thermal conductive wall have the vacuum heat insulating structure, the vacancy of the hollow portion of the high thermal conductive wall is made relatively low whereas the vacancy of the hollow portion of the low thermal conductive wall is made relatively high. In contrast, in the case where neither of the high thermal conductive wall nor the low thermal conductive wall has the vacuum heat insulating structure, the high thermal conductive wall is made of a relatively high thermal conductive material whereas the low thermal conductive wall is made of a relatively low thermal conductive material.

(Arrangement Direction of Electric Cells)

The container 1012 may house therein a single electric cell 1006 or a plurality of electric cells 1006. In the case where the container 1012 houses a plurality of electric cells 1006 therein, the plurality of electric cells 1006 is desirably arranged in parallel to the top wall 1100 of the cover 1026, more generally, the plurality of electric cells 1006 are arranged in parallel to the high thermal conductive wall. Consequently, the heat can radiate in a direction perpendicular to the arrangement direction of the electric cells 1006, thus enhancing the uniformity of the temperature of the electric cells 1006.

(Space, to which Heat is Allowed to Radiate)

The space SP2, to which the heat is allowed to radiate, is desirably an open space. The open space communicates with an outside space, and further, is a space in which ventilation is carried out.

In the case where the space SP2, to which the heat is allowed to radiate, is the open space, a ventilating mechanism 1300 such as a ventilation fan for forcibly ventilating the space SP2, to which the heat is allowed to radiate, is provided at the module battery housing rack 1004. As a consequence, the heat can efficiently radiate from the space SP2, to which the heat is allowed to radiate. The ventilation may be carried out by not the forcible ventilation but natural convection. Desirably, a dust preventing filter 1304 is disposed at a ventilation port 1302 formed at the module battery housing rack 1004. Hence, it is possible to suppress dust from intruding into the battery housing structure 1000.

In the case where the battery housing structure 1000 is installed in a region in which there is much dust or the like, and therefore, the dust preventing filter needs to be replaced in a short period of time, the space SP2, to which the heat is allowed to radiate, may be a closed space. The closed space does not communicate with an outside space, and further, is a space where no ventilation is carried out.

(Installation Site of Heater)

The heater 1008 is desirably disposed along the inner surface of the low thermal conductive wall and, more desirably, it is desirably disposed along the inner surface of the low thermal conductive wall opposite to the high thermal conductive wall. For example, in the case where the top wall 1100 of the cover 1026 is the high thermal conductive wall, the heater 1008 is desirably disposed along the inner surface of all or part of the side wall 1104 and bottom wall 1106 of the casing 1024 and, more desirably, it is disposed along the inner surface of the bottom wall 1106 of the casing 1024. In this manner, the electric cells 1006 are interposed between the high thermal conductive wall and the heater 1008, and further, the heat generated by the heater 1008 can be suppressed from radiating outside of the container 1012 without any contribution to heating the electric cells 1006, thus reducing power consumption of the heater 1008.

(Installation Site of Electrical Component)

An electrical component 1400 other than the electrode terminal 1014 is desirably housed in the space SP1, in which the module battery 1002 is housed.

Consequently, temperature around the electrical component 1400 hardly rises. The electrical component 1400 is, for example, a cable, an electric circuit board, and the like.

(Upper Cover)

Desirably, the upper end of the module battery housing rack 1004 is covered with an upper cover 1500. In this manner, even in the case where the battery housing structure 1000 is installed outdoors, rainwater can be suppressed from intruding the inside the module battery housing rack 1004, and further, the top plate 1030 and the top wall 1100 of the cover 1026 can be suppressed from being heated by solar radiation. When the battery housing structure 1000 is installed indoors, the upper cover 1500 may be omitted.

The frame 1038 is provided with a supporter stay 1600 that is formed into a rod-like shape and is horizontally stretched. The top plate 1030 is placed on the stay 1600 and is supported by the stay 1600 at a support position 1602 apart from the first portion 1202. The second portion 1204 desirably has elasticity.

Second Embodiment (Outline of Battery Housing Structure)

A second embodiment relates a battery housing structure that replaces the battery housing structure in the first embodiment.

Figure 3:
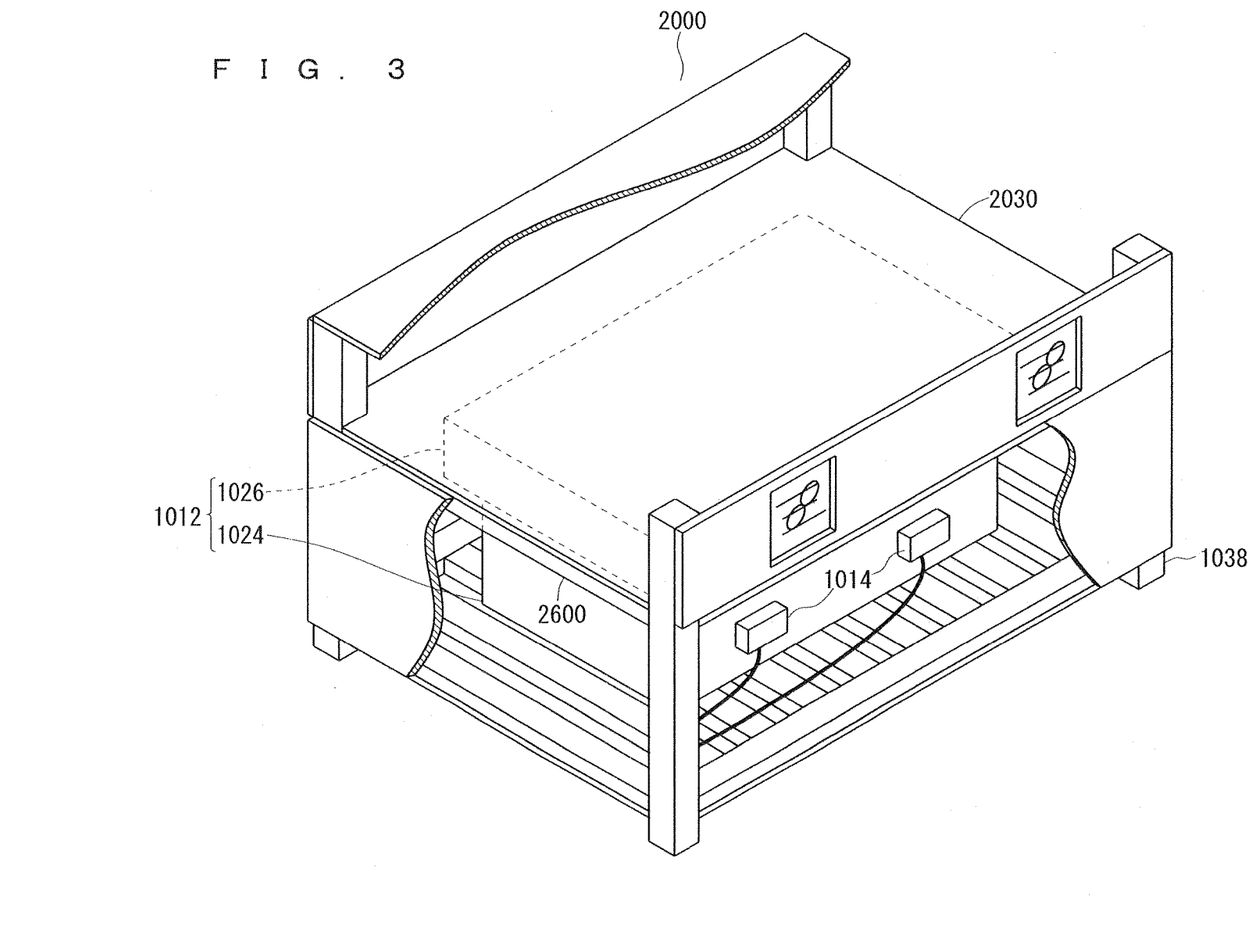
FIG. 3 is a perspective view showing a battery housing structure in a second embodiment.
Figure 4:
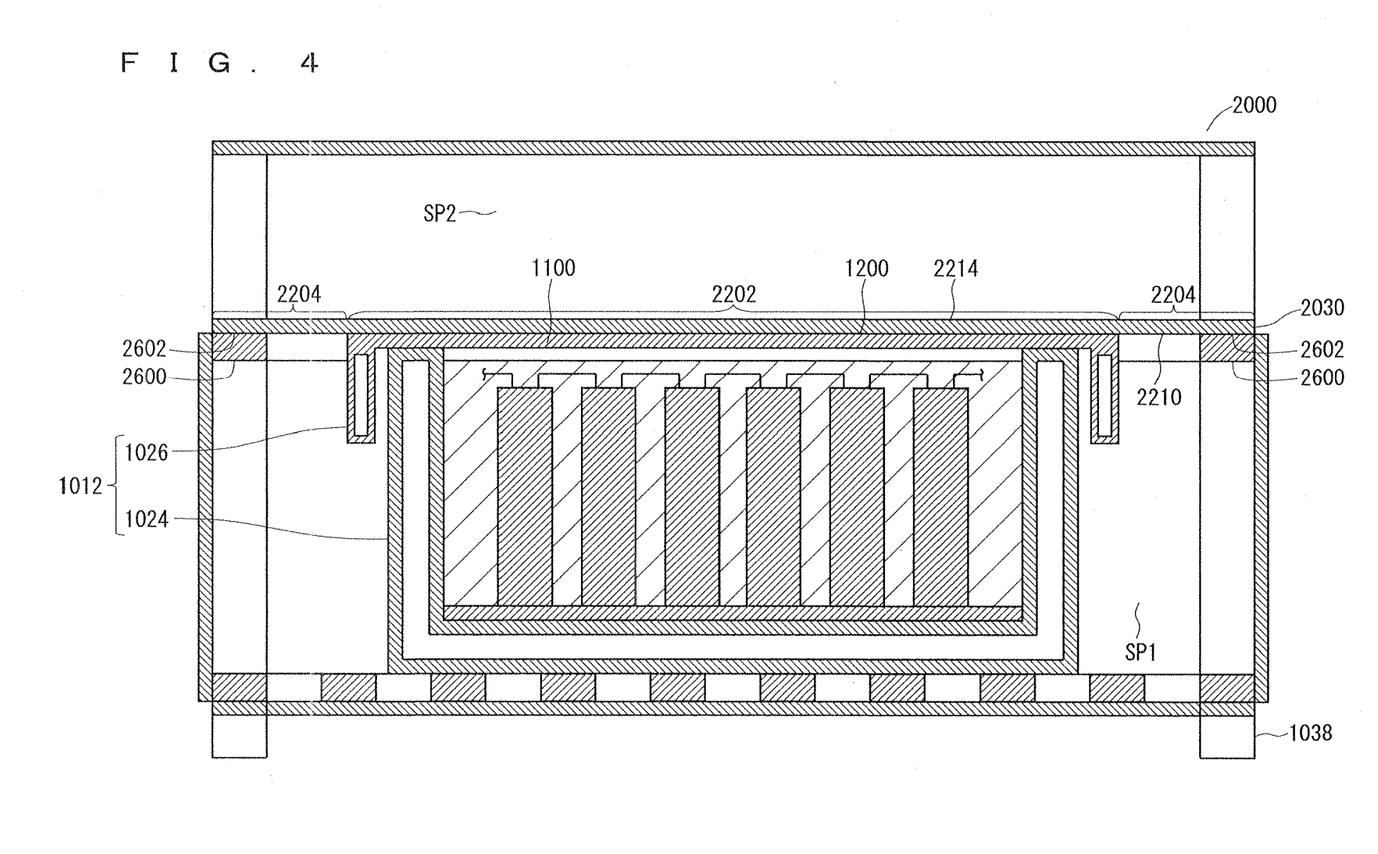
FIG. 4 is a cross-sectional view showing the battery housing structure in the second embodiment.

FIG. 3 and FIG. 4 are schematic views showing a battery housing structure in the second embodiment, wherein FIG. 3 is a perspective view whereas FIG. 4 is a cross-sectional view.

A battery housing structure 2000 in the second embodiment is identical to the battery housing structure 1000 in the first embodiment except that a top plate 2030 having no opening is used in place of the top plate 1030 having the opening 1206, as shown in FIG. 3 and FIG. 4. Therefore, in the description of the second embodiment, the same constituents as those in the first embodiment are assigned by the same reference numerals as in the first embodiment, and further, reference is made mainly to matters different from those in the first embodiment. The description of the first embodiment can be applied to matters that are not referred to in the description of the second embodiment.

(Heat Radiation Structure)

The top plate 2030 has a greater planar shape than that of an outer surface 1200 of a top wall 1100 of a cover 1026. A first portion 2202 occupying the center of the top plate 2030 overlaps the outer surface 1200 of the top wall 1100 of the cover 1026 whereas a second portion 2204 occupying the periphery of the top plate 2030 protrudes from the outer surface 1200 of the top wall 1100 of the cover 1026. The second portion 2204 surrounds the first portion 2202.

A first main surface 2210 of the top plate 2030 is brought into direct contact with the entire outer surface 1200 of the top wall 1100 of the cover 1026 over the entire first portion 2202 whereas it is apart from a container 1012 at the second portion 2204. A second main surface 2214 of the top plate 2030 is exposed to a space SP2, to which heat is allowed to radiate.

With the heat radiation structure in the second embodiment, the heat radiating through the top wall 1100 is allowed to radiate to the space SP2, to which the heat is allowed to radiate, mainly through the first portion 2202. A space SP1, in which a module battery 1002 is housed, and the space SP2, to which the heat is allowed to radiate, are separated from each other via the second portion 2204. Consequently, the heat hardly flows from the space SP2, to which the heat is allowed to radiate, to the space SP1, in which the module battery 1002 is housed, so that the temperature around the electrode terminal 1014 hardly rises.

A frame 1038 is provided with a supporter stay 2600 that is formed into a rod-like shape and is horizontally stretched.

The top plate 2030 is placed on the stay 2600 and is supported by the stay 2600 at a support position 2602 apart from the first portion 2202. The second portion 2204 desirably has elasticity. The outer surface 1200 of the top wall 1100 of the cover 1026 is oriented upward in a vertical direction, and therefore, the second portion 2204 is deformed, so that the top plate 2030 is hunched downward whereas the first portion 2202 is pressed against the top wall 1100 of the cover 1026. Thus, thermal resistance at the interface between the top wall 1100 and the top plate 2030 is reduced, and therefore, the heat can be efficiently allowed to radiate.

Third Embodiment (Outline of Battery Housing Structure)

A third embodiment relates a battery housing structure that replaces the battery housing structure in the first embodiment.

Figure 5:
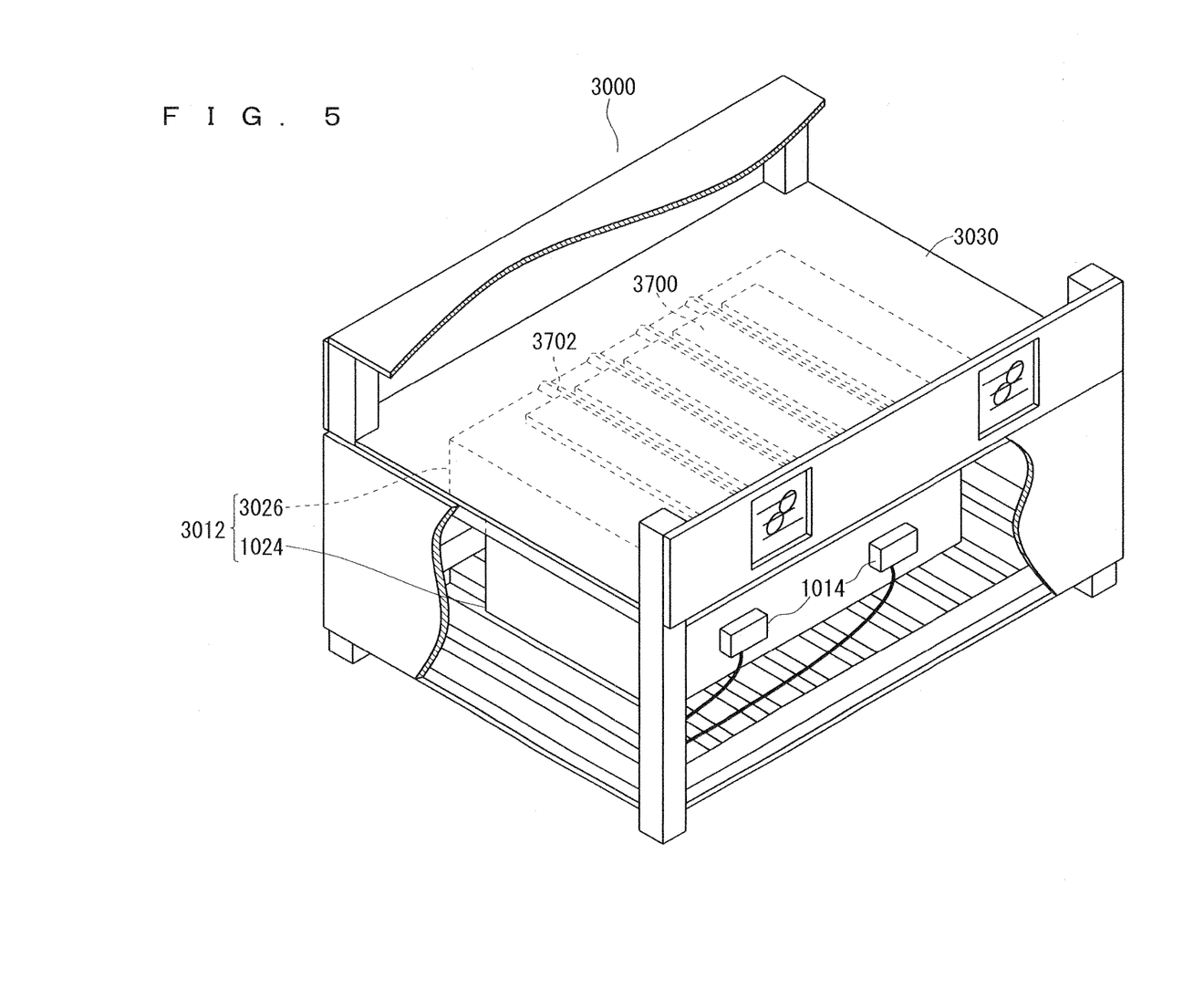
FIG. 5 is a perspective view showing a battery housing structure in a third embodiment.
Figure 6:
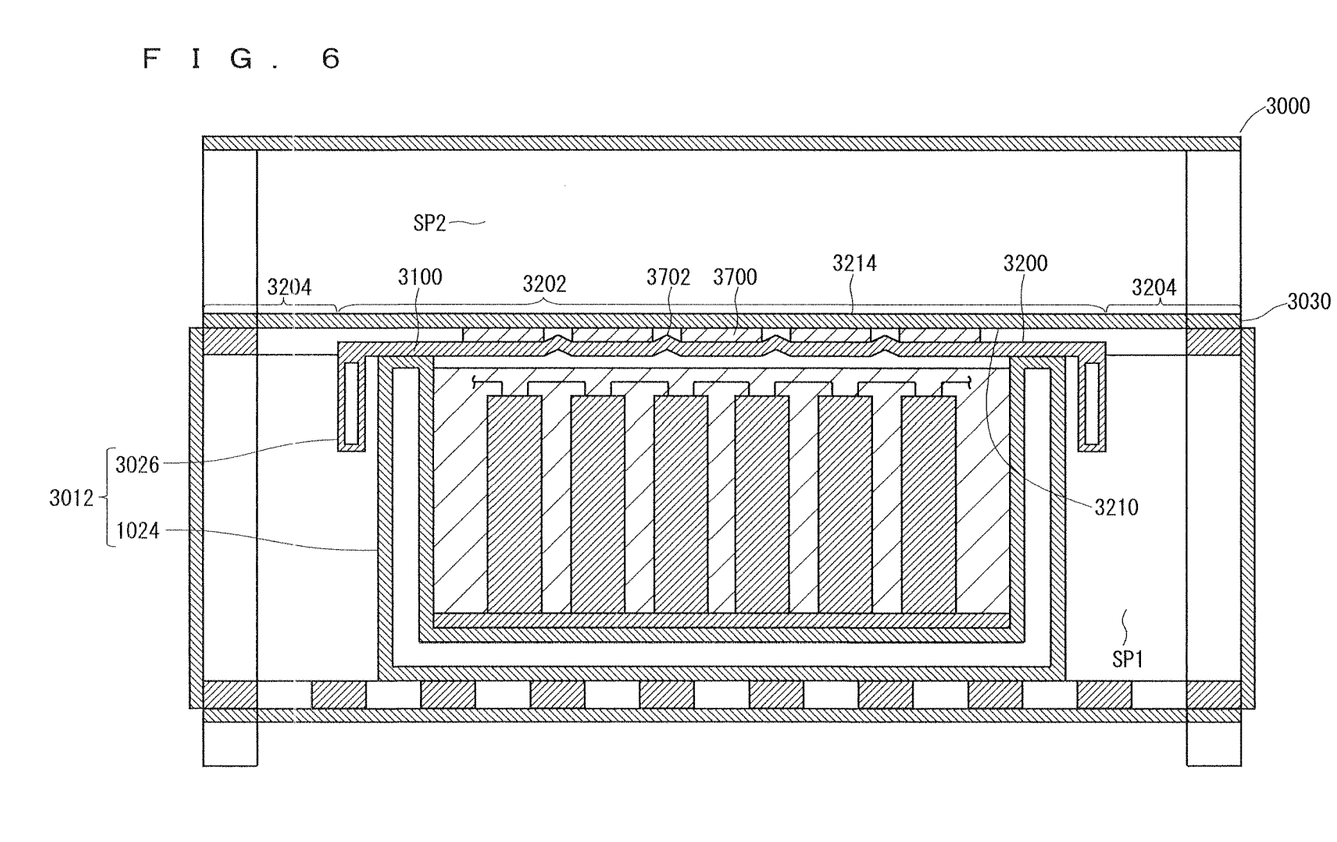
FIG. 6 is a cross-sectional view showing the battery housing structure in the third embodiment.

FIG. 5 and FIG. 6 are schematic views showing a battery housing structure in the third embodiment, wherein FIG. 5 is a perspective view whereas FIG. 6 is a cross-sectional view.

A battery housing structure 3000 in the third embodiment is identical to the battery housing structure 1000 in the first embodiment except that a top plate 3030 having no opening is used in place of the top plate 1030 having the opening 1206 and a thermal conducting medium 3700 is held between a top wall 3100 and a first portion 3202 of the top plate 3030, wherein the top wall 3100 having a rib 3702 formed thereat is used in place of a top wall 1100 having a flat outer surface 1200. Therefore, in the description of the third embodiment, the same constituents as those in the first embodiment are assigned by the same reference numerals as in the first embodiment, and further, reference is made mainly to matters different from those in the first embodiment. The description of the first embodiment can be applied to matters that are not referred to in the description of the third embodiment.

(Heat Radiation Structure)

The top plate 3030 has a greater planar shape than that of an outer surface 3200 of the top wall 3100 of a cover 3026 of a container 3012. The first portion 3202 occupying the center of the top plate 3030 overlaps the outer surface 3200 of the top wall 3100 of the cover 3026 whereas a second portion 3204 occupying the periphery of the top plate 3030 protrudes from the outer surface 3200 of the top wall 3100 of the cover 3026. The second portion 3204 surrounds the first portion 3202. A first main surface 3210 of the top plate 3030 faces the outer surface 3200 of the top wall 3100 at the first portion 3202 whereas it is apart from the container 3012 at the second portion 3204. A second main surface 3214 of the top plate 3030 is exposed to a space SP2, to which heat is allowed to radiate.

The thermal conducting medium 3700 is held between the top wall 3100 of the cover 3026 and the first portion 3202, is brought into direct contact with the outer surface 3200 of the top wall 3100, and is brought into direct contact with the first main surface 3210 of the top plate 3030 at the first portion 3202.

With the heat radiation structure in the third embodiment, the heat radiating via the top wall 3100 radiates to the space SP2, to which the heat is allowed to radiate, mainly via the thermal conducting medium 3700 and the first portion 3202. A space SP1, in which a module battery 1002 is housed, and the space SP2, to which the heat is allowed to radiate, are separated from each other via the second portion 3204.

Consequently, the heat hardly flows from the space SP2, to which the heat is allowed to radiate, to the space SP1, in which the module battery 1002 is housed, so that temperature around the electrode terminal 1014 hardly rises. Thermal radiation amount is properly adjusted by thermal resistance of the thermal conducting medium 3700 or the like, thereby properly adjusting the inside temperature of the container 3012. The thermal resistance of the thermal conducting medium 3700 is adjusted according to the material, planar shape, and the like of the thermal conducting medium 3700.

The thermal conducting medium 3700 may be a plate-like object made of metal and an alloy or a fibrous aggregate made of metal and an alloy such as steel wool. The thermal conducting medium 3700 may be a viscous member such as silicon grease. In the case where the thermal conducting medium 3700 is held between the top wall 3100 of the cover 3026 and the top plate 3030, the uneven outer surface 3200 of the top wall 3100 of the cover 3026 may not match with the uneven first main surface 3210 of the top plate 3030. In other words, the rib 3702 may be formed at the top wall 3100 owing to the thermal conducting medium 3700.

A single thermal conducting medium 3700 or a plurality of thermal conducting mediums 3700 may be provided. In the case where a plurality of thermal conducting mediums 3700 are provided, the thermal conducting mediums 3700 is desirably arranged in a uniform fashion.

Fourth Embodiment

A fourth embodiment relates a battery housing structure that replaces the battery housing structure in the first embodiment.

Figure 7:
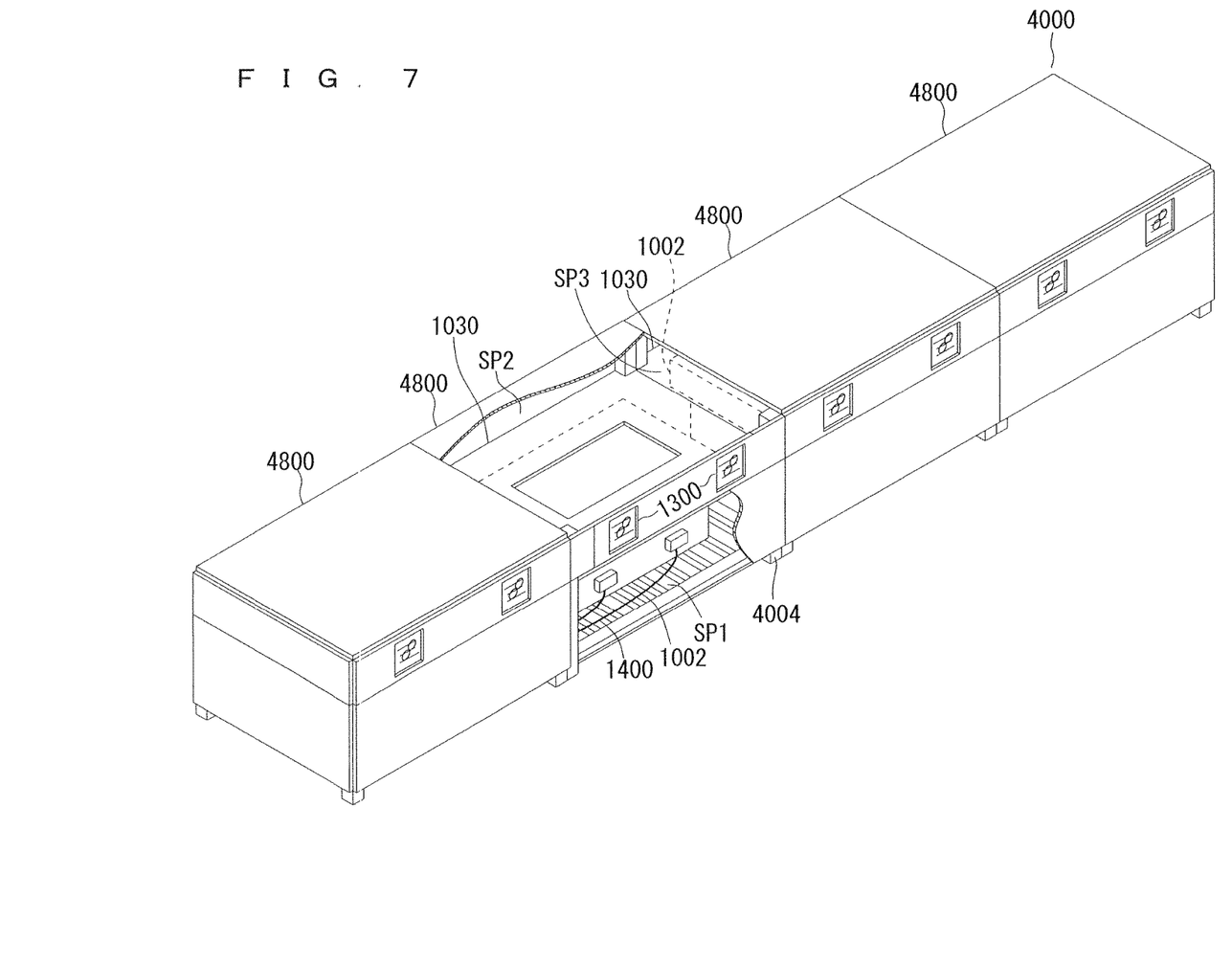
FIG. 7 is a perspective view showing a battery housing structure in a fourth embodiment.

FIG. 7 is a schematic view showing a battery housing structure 4000 in the fourth embodiment, and it is a perspective view.

The battery housing structure 4000 in the fourth embodiment is same as an arranged body in which a plurality of battery housing structures 1000 in the first embodiment are arranged in a horizontal direction with a side plate 1032 between the adjacent battery housing structures 1000 being removed, as shown in FIG. 7. Therefore, in the description of the fourth embodiment, the same constituents as those in the first embodiment are assigned by the same reference numerals, and further, reference is made mainly to matters different from those in the first embodiment. The description of the first embodiment can be applied to matters that are not referred to in the description of the fourth embodiment.

In the battery housing structure 4000, a plurality of module batteries 1002 are housed inside a module battery housing rack 4004. A plurality of housing compartments 4800, each of which is similar to the battery housing structure 1000 in the first embodiment, are disposed on the module battery housing rack 4004.

Each of the plurality of housing compartments 4800 has a space SP1, in which the module battery 1002 is housed, and a space SP2, to which heat is allowed to radiate.

Each of the plurality of housing compartments 4800 houses therein the single module battery 1002, and further, includes a top plate 1030. The top plates 1030 respectively disposed in the plurality of housing compartments 4800 may be coupled to each other.

The plurality of housing compartments 4800 are arranged in a horizontal direction in parallel to the top plates 1030. The spaces SP2, to which the heat is allowed to radiate, pertaining to each of the plurality of housing compartments 4800 are continuous to each other. Moreover, a further space SP3, to which the heat is allowed to radiate, is defined in such a manner as to be common to the plurality of module batteries 1002. The spaces SP1, each of which houses therein the module battery 1002 pertaining to each of the plurality of housing compartments 4800, also are continuous to each other.

Each of the plurality of housing compartments 4800 adopts the heat radiation structure in the first embodiment. Consequently, the heat is allowed to radiate in the same manner as in the heat radiation structure in the first embodiment except that the space SP3, to which the heat is allowed to radiate, is common to the plurality of module batteries 1002.

Each of the plurality of housing compartments 4800 has a ventilating mechanism 1300 for forcibly ventilating the space SP2, to which the heat is allowed to radiate. Although the installation of the ventilating mechanism 1300 at some of the plurality of housing compartments 4800 may be omitted, the space SP3, to which the heat is allowed to radiate and which is common to the plurality of module batteries 1002, is ventilated by the plurality of ventilating mechanisms 1300. In this manner, even if some of the plurality of ventilating mechanisms 1300 malfunction, the ventilation cannot be completely stopped, thus enhancing redundancy.

The heat radiation structure in the first embodiment may be replaced with the heat radiation structure in the second or third embodiment.

An electrical component 1400 desirably passes the space SP1 housing the module battery 1002 therein. Therefore, temperature around the electrical component 1400 hardly rises.

Fifth Embodiment

A fifty embodiment relates a battery housing structure that replaces the battery housing structure in the first embodiment.

Figure 8:
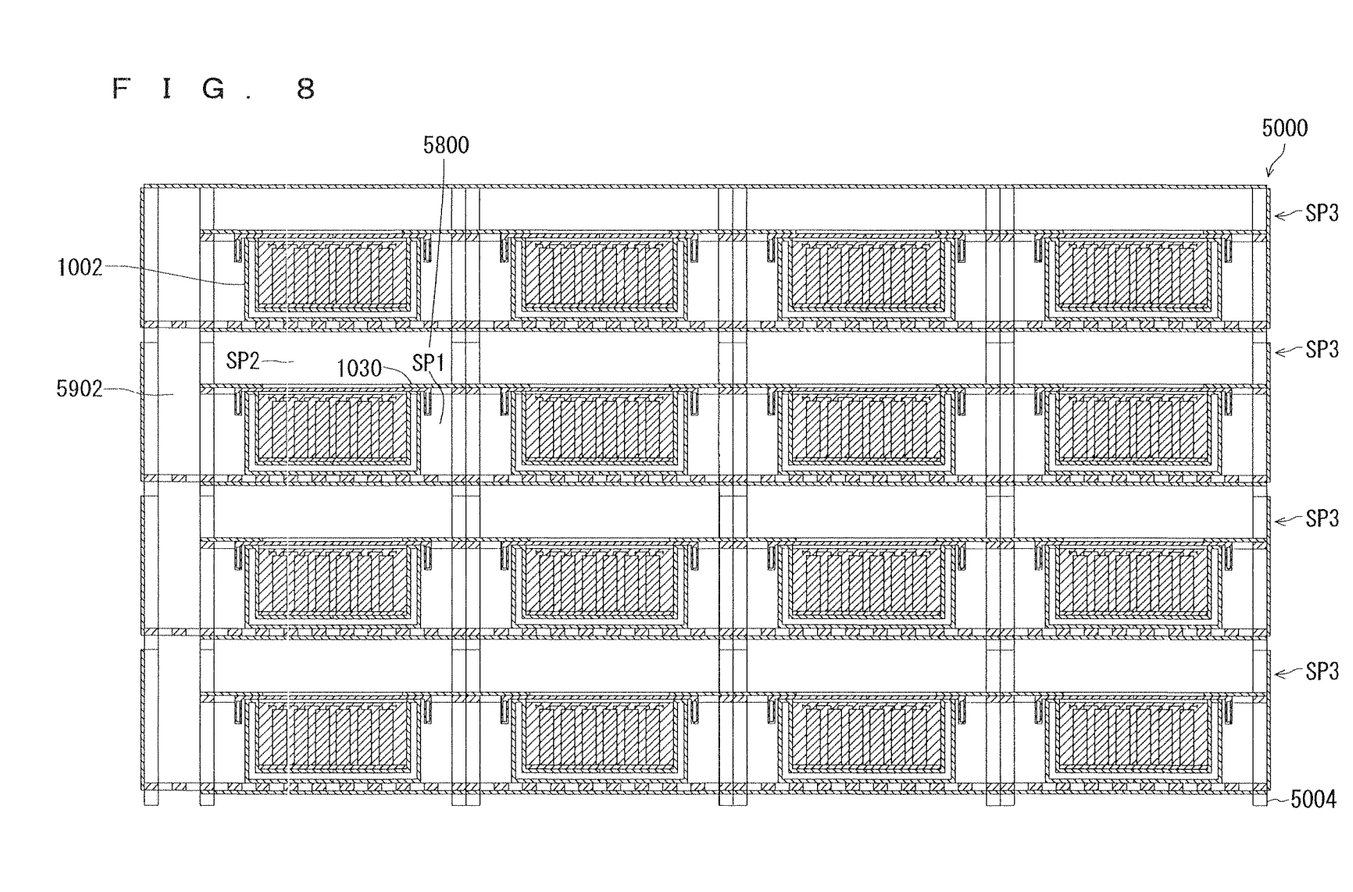
FIG. 8 is a cross-sectional view showing a battery housing structure in a fifth embodiment.

FIG. 8 is a schematic view showing a battery housing structure in the fifth embodiment, and it is a cross-sectional view.

A battery housing structure 5000 in the fifth embodiment is same as an arranged body in which a plurality of battery housing structures 1000 in the first embodiment are arranged in a horizontal direction and a vertical direction with side plates 1032 between the adjacent battery housing structures 1000 and upper covers 1500 are removed and with electric component housing chambers 5902 being added, as shown in FIG. 8. Therefore, in the description of the fifth embodiment, the same constituents as those in the first embodiment are assigned by the same reference numerals, and further, reference is made mainly to matters different from those in the first embodiment. The description of the first embodiment is applied to matters that are not referred to in the description of the fifth embodiment.

In the battery housing structure 5000, a plurality of module batteries 1002 is housed inside a module battery housing rack 5004. A plurality of housing compartments 5800 and the electric component housing chamber 5902 are disposed in the module battery housing rack 5004.

Each of the plurality of housing compartments 5800 has a space SP1, in which a module battery 1002 is housed, and a space SP2, to which heat is allowed to radiate. Each of the plurality of housing compartments 5800 houses therein the single module battery 1002, and further, includes a top plate 1030. The top plates 1030 respectively disposed in the plurality of housing compartments 5800 arranged in the horizontal direction may be coupled to each other.

The plurality of housing compartments 5800 are arranged in a horizontal direction parallel to the top plates 1030 and in a vertical direction perpendicular to the top plates 1030. The spaces SP2, to which the heat is allowed to radiate, pertaining to the plurality of housing compartments 5800 arranged in the horizontal direction are continuous to each other, thus forming a further space SP3, to which the heat is allowed to radiate, in such a manner as to be common to the plurality of module batteries 1002. The spaces SP1, each of which houses therein the module battery 1002 pertaining to each of the plurality of housing compartments 5800 arranged in the horizontal direction, also are continuous to each other.

Each of the plurality of housing compartments 5800 adopts the heat radiation structure in the first embodiment. Consequently, the heat is allowed to radiate in the same manner as in the heat radiation structure in the first embodiment except that the space SP3, to which the heat is allowed to radiate, is common to the plurality of module batteries 1002.

Each of the plurality of housing compartments 5800 has a ventilating mechanism for forcibly ventilating the space SP2, to which the heat is allowed to radiate. Although the installation of the ventilating mechanism at some of the plurality of housing compartments 5800 may be omitted, the space SP3, to which the heat is allowed to radiate and which is common to the plurality of module batteries 1002, is ventilated by the plurality of ventilating mechanisms. In this manner, even if some of the plurality of ventilating mechanisms 1300 malfunction, the ventilation cannot be completely stopped, thus enhancing redundancy.

The heat radiation structure in the first embodiment may be replaced with the heat radiation structure in the second or third embodiment.

While the invention has been shown and described in detail, the foregoing description is in all aspects illustrative and not restrictive. It is therefore understood that numerous modifications and variations can be devised without departing from the scope of the present invention.

EXPLANATION OF REFERENCE NUMERALS 1000, 2000, 3000, 4000, 5000 battery housing structure
1002 module battery
1006 electric cell
1014 electrode terminal
1016 wiring
1030, 2030, 3030 top plate
1202, 2202, 3202 first portion
1204, 2204, 3204 second portion
SP2 space, to which heat is allowed to radiate
SP3 space, to which heat is allowed to radiate

The invention claimed is:
1. A battery housing structure comprising:
at least one battery including: at least one electric cell for a sodium-sulfur battery; a container provided with a first wall having a relatively high thermal conductivity and a second wall having a relatively low thermal conductivity, and configured to house said at least one electric cell therein; an electrode terminal penetrating said second wall; and a wiring for electrically connecting said at least one electric cell and said electrode terminal to each other inside said container; and
a battery housing that houses said at least one battery therein, said battery housing including: a plate having a first portion overlapping an outer surface of said first wall and a second portion surrounding said first portion; and a supporter for supporting said plate at a support position apart from said first portion, said second portion of said plate is a hollow member such that the entirety of said second portion is extending horizontally from said first portion and protruding from the outer surface of said first wall, said plate defining a first main surface that is brought into direct contact with the outer surface of said first wall at said first portion and is apart from said container at said second portion, a second main surface exposed to a first space, to which heat is allowed to radiate and a second space in which said at least one battery is housed, wherein the first space is separated from the second space via said second portion, the outer surface of said first wall is oriented upward in a vertical direction, and said second portion has elasticity and said second portion is deformed such that said plate is hunched downward so as to press said first portion against said first wall such that thermal resistance between said plate and said first wall is reduced, whereby said heat is allowed to radiate.

2. The battery housing structure according to claim 1, wherein an opening having a planar shape smaller than the outer surface of said first wall is formed at said first portion apart from said second portion, and said first main surface is brought into direct contact with a periphery of the outer surface of said first wall at a non-opening other than said opening at said first portion.

3. The battery housing structure according to claim 1, wherein said first main surface is brought into direct contact with the entire outer surface of said first wall over said entire first portion.

4. A battery housing structure comprising:

at least one battery including: at least one electric cell for a sodium-sulfur battery; a container provided with a first wall having a relatively high thermal conductivity and a second wall having a relatively low thermal conductivity, and configured to house said at least one electric cell therein; an electrode terminal penetrating said second wall; and a wiring for electrically connecting said at least one electric cell and said electrode terminal to each other inside said container;

a battery housing that houses said at least one battery therein, said battery housing including: a plate having a first portion overlapping an outer surface of said first wall and a second portion surrounding said first portion; and a supporter for supporting said plate at a support position apart from said first portion, said second portion of said plate is a hollow member such that the entirety of said second portion is extending horizontally from said first portion and protruding from the outer surface of said first wall, said plate defining a first main surface that faces the outer surface of said first wall at said first portion and is apart from said container at said second portion, a second main surface exposed to a first space, to which heat is allowed to radiate and a second space in which said at least one battery is housed, wherein the first space is separated from the second space via said second portion, the outer surface of said first wall is oriented upward in a vertical direction, and said second portion has elasticity and said second portion is deformed such that said plate is hunched downward so as to press said first portion against said first wall such that thermal resistance between said plate and said first wall is reduced, whereby said heat is allowed to radiate; and a thermal conducting medium held between said first wall and said first portion.

5. The battery housing structure according to claim 4, wherein said thermal conducting medium is a plate-like member made of metal or an alloy.

6. The battery housing structure according to claim 4, wherein said thermal conducting medium is a fibrous aggregate made of metal or an alloy.

7. The battery housing structure according to claim 1, wherein said first wall is formed upward in the vertical direction, and said second wall is formed downward in the vertical direction.

8. The battery housing structure according to claim 1, wherein said at least one electric cell comprises a plurality of electric cells, said plurality of electric cells are housed inside the container, and said plurality of electric cells are arranged in a direction parallel to said first wall.

9. The battery housing structure according to claim 1, wherein said battery housing further comprises at least one ventilating mechanism for forcibly ventilating the first space, to which said heat is allowed to radiate.

10. The battery housing structure according to claim 9, wherein said at least one battery comprises a plurality of batteries; said plurality of batteries are housed in the battery housing; the first space, to which said heat is allowed to radiate, is common to said plurality of batteries; said at least one ventilating mechanism comprises a plurality of ventilating mechanisms; and said plurality of ventilating mechanisms forcibly ventilate the first space, to which said heat is allowed to radiate.

11. The battery housing structure according to claim 4, wherein said first wall is formed upward in the vertical direction, and said second wall is formed downward in the vertical direction.

12. The battery housing structure according to claim 4, wherein said at least one electric cell comprises a plurality of electric cells, said plurality of electric cells are housed inside the container, and said plurality of electric cells are arranged in a direction parallel to said first wall.

13. The battery housing structure according to claim 4, wherein said battery housing further comprises at least one ventilating mechanism for forcibly ventilating the first space, to which said heat is allowed to radiate.

14. The battery housing structure according to claim 13, wherein said at least one battery comprises a plurality of batteries; said plurality of batteries are housed in the battery housing; the first space, to which said heat is allowed to radiate, is common to said plurality of batteries; said at least one ventilating mechanism comprises a plurality of ventilating mechanisms; and said plurality of ventilating mechanisms forcibly ventilate the first space, to which said heat is allowed to radiate.

* * * * *